(12) United States Patent
Tsung et al.

(10) Patent No.: US 9,810,397 B2
(45) Date of Patent: Nov. 7, 2017

(54) LAMPSHADE AND LAMP

(71) Applicant: PEGATRON CORPORATION, Taipei (TW)

(72) Inventors: Chih-Hsien Tsung, Taipei (TW); Tzu-Pin Chao, Taipei (TW); Shu-Yin Pan, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 51 days.

(21) Appl. No.: 14/994,514

(22) Filed: Jan. 13, 2016

(65) Prior Publication Data
US 2016/0298819 A1 Oct. 13, 2016

(30) Foreign Application Priority Data
Apr. 8, 2015 (TW) .............................. 104111321 A (51) Int. Cl.
| | |
|---|---|
| F21V 7/04 | (2006.01) |
| F21V 1/06 | (2006.01) |
| F21V 8/00 | (2006.01) |
| F21W 121/00 | (2006.01) |
| F21V 23/04 | (2006.01) |
| F21Y 101/00 | (2016.01) |
| F21Y 115/10 | (2016.01) |

(52) U.S. Cl.
CPC ................ F21V 1/06 (2013.01); G02B 6/005 (2013.01); *F21V 23/04* (2013.01); *F21W 2121/00* (2013.01); *F21Y 2101/00* (2013.01); *F21Y 2115/10* (2016.08)

(58) Field of Classification Search
CPC .. G02B 6/0038; G02B 6/0036; G20B 6/0063; F21V 1/06

USPC .......................................................... 362/606
See application file for complete search history.

(56) References Cited

U.S. PATENT DOCUMENTS

| | | | |
|---|---|---|---|
| 2002/0118543 A1 | 8/2002 | Wu | |
| 2003/0189833 A1 | 10/2003 | Chen | |
| 2012/0320606 A1* | 12/2012 | Vossoughi | ................ F21V 1/00 362/351 |
| 2015/0029730 A1* | 1/2015 | Chen | ......................... F21V 1/06 362/352 |

(Continued)

FOREIGN PATENT DOCUMENTS

| | | |
|---|---|---|
| CN | 101994931 | 3/2011 |
| DE | 202004013227 U1 | 2/2005 |

*Primary Examiner* — Ahshik Kim
(74) *Attorney, Agent, or Firm* — Muncy, Geissler, Olds & Lowe, P.C.

(57) ABSTRACT

A lampshade and a lamp are disclosed. The lampshade includes a base plate, an elastic cover, a support member, and a linking-up member. The base plate includes a container and a positioning member, and the container and the positioning member are configured on a surface of the base plate. The elastic cover covers the surface of the base plate. Two ends of the support member are bent to form two pivots which are pivotally connected to the base plate. The support member is capable of being received in the container. The linking-up member includes a fixing portion, a first end and a second end. The fixing portion is configured between the first end and the second end, and the fixing portion fixed to the support member. The linking-up member is movably disposed at the positioning member, and the linking-up member may allow the support member to move.

13 Claims, 12 Drawing Sheets

(56) References Cited

U.S. PATENT DOCUMENTS

2016/0201871 A1* 7/2016 Anderson ............... F21V 1/06
 362/352
2017/0097145 A1* 4/2017 Friz ...................... F21V 17/105

\* cited by examiner

LAMPSHADE AND LAMP

CROSS REFERENCE TO RELATED APPLICATIONS

This Non-provisional application claims priority under 35 U.S.C. §119(a) on Patent Application No(s). 104111321 filed in Taiwan, Republic of China on Apr. 8, 2015, the entire contents of which are hereby incorporated by reference.

BACKGROUND

Field of Invention

The invention relates to a lampshade and a lamp.

Related Art

Conventional lampshades or lamps are installed in ceilings or stand on desks or floors, such that some space will be occupied. Currently, downlights are employed for aesthetic and space saving reasons. However, because downlights need to be installed in walls, the walls require renovating in advance. Accordingly, the installation of downlight should be planned in the project of interior design and renovation beforehand. It is not easy for consumers to buy and install their lamps on their own.

Moreover, conventional lamps use buttons to switch the light on or off. But they are not amusing to users for using because their appearance are boring.

SUMMARY

The disclosure is to provide a lampshade and a lamp with simple and novel structural design for space saving, easy installation and amusement of use.

A lampshade according to the disclosure includes a base plate, an elastic cover, at least a support member, and a linking-up member. The base plate includes at least a container and a positioning member, and the container and the positioning member are configured on a surface of the base plate. The elastic cover covers the surface of the base plate. Two ends of the support member are bent to form two pivots which are pivotally connected to the base plate, and the support member is capable of being received in the container. The linking-up member has a fixing portion, a first end and a second end. The fixing portion is configured between the first end and the second end and fixed to the support member. The linking-up member is movably disposed at the positioning member and allows the support member to move.

In one embodiment, the support member rotates around the pivots and the support member and the base plate have a predetermined included angle when a force is applied to the first end. The support member rotates around the pivots and the support member is received in the container when another force is applied to the second end.

In one embodiment, the positioning member is a thorough hole, and the linking-up member passes through the thorough hole.

In one embodiment, the positioning member is a ring, the linking-up member passes through the ring, and the first end and the second end are located on the surface of the base plate.

In one embodiment, the linking-up member is a rope-shaped object,

A lamp according to the disclosure includes a light-emitting unit and a lampshade. The light-emitting unit includes a switch component. The lampshade includes a base plate, an elastic cover, at least a support member, and a linking-up member. The base plate includes at least a container and a positioning member. The container and the positioning member are configured on a surface of the base plate, and the light-emitting unit is disposed on the base plate. The elastic cover covers the surface of the base plate. Two ends of the support member are bent to form two pivots which are pivotally connected to the base plate, the support member is capable of being received in the container, and the switch component is adjacent to one of the two pivots. The linking-up member includes a fixing portion, a first end and a second end. The fixing portion is configured between the first end and the second end and fixed to the support member. The linking-up member is movably disposed at the positioning member and allows the support member to move.

In one embodiment, the support member rotates around the pivots, the support member and the base plate have a predetermined included angle and the support member contacts the switch component when a force is applied to the first end. The support member rotates around the pivots, the support member is received in the container and the support member does not contact the switch component when another force is applied to the second end.

In one embodiment, the light-emitting unit is disposed in the container.

In one embodiment, the lampshade further includes a light guide plate, and the light guide plate is disposed on the base plate and connected to the light-emitting unit.

In one embodiment, the light guide plate is disposed in the container.

In one embodiment, the positioning member is a thorough hole, and the linking-up member passes through the thorough hole.

In one embodiment, the positioning member is a ring, the linking-up member passes through the ring, and the first end and the second end are located on the surface of the base plate.

In one embodiment, the linking-up member is a rope-shaped object.

As mentioned above, the lampshade according to the disclosure is designed with the movable support member, the connection between the linking-up member and the support member, and the elastic cover covering the surface of the base plate. As a result, when switching the light on, a user may directly apply a downward force to the first end, so the support member rotates around the pivots and the elastic cover becomes stretched in a three-dimensional state. Moreover, in the lamp according to the disclosure, the support member can contact the switch component to turn on the light-emitting unit. While turning off the light, a user may apply a downward force to the second end, so the support member is pulled up and then received in the container. At this time, the support member does not contact the switch component to turn off the light-emitting unit. The installation becomes easy because the base plate helps the lampshade and the lamp to be hung on the wall or placed upright on the desk. Moreover, when the lamp is not in use (turned off), the lampshade is in a planar state to save space. It is more amusing in use that the light-emitting unit is turned on if the lamp is in the three-dimensional state, and the light-emitting unit is turned off if the lamp is in the planar state.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION

The embodiments of the invention will be apparent from the following detailed description, which proceeds with reference to the accompanying drawings, wherein the same references relate to the same elements.

Figure 1:
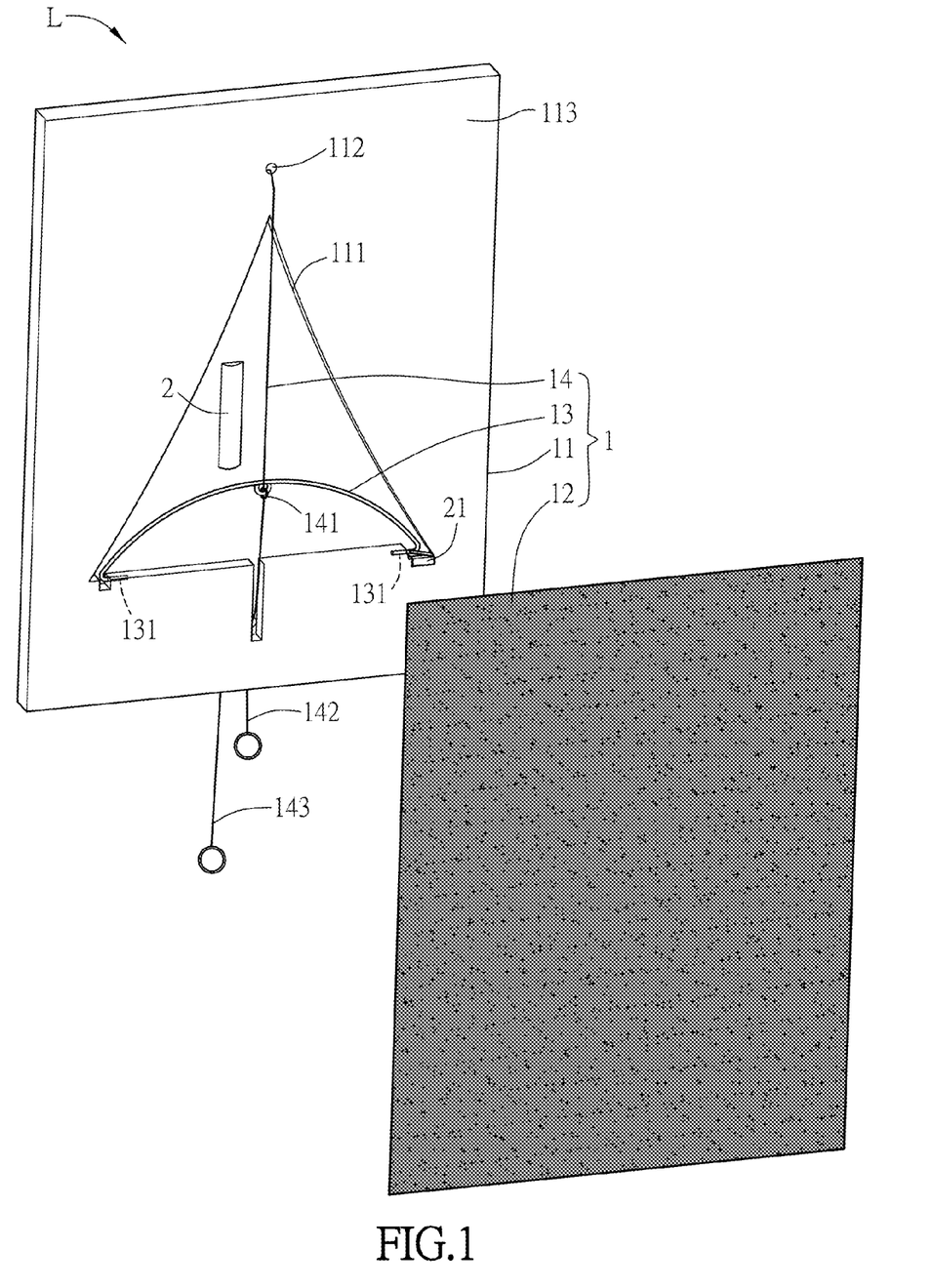
FIG. 1 is a schematic diagram of a lamp according to an embodiment.

Referring to FIG. 1, it is a schematic diagram of a lamp according to an embodiment. The lamp L according to this embodiment includes a lampshade 1 and a light-emitting unit 2. The lampshade 1 includes a base plate 11, an elastic cover 12, at least a support member 13, and a linking-up member 14. The base plate 11 has at least a container 111 and a positioning member 112. The container 111 and the positioning member 112 are configured on a surface 113 of the base plate 11. That is to say, the container 111 and the positioning member 112 are configured on the same surface of the base plate 11, for example the surface 113. In the embodiment, the support member 13 is movably disposed on the base plate 11, so that the lampshade 1 can change into the planar state or the three-dimensional state. It becomes more interesting. The following description illustrates the movement of the support member 13 and how it makes the lampshade 1 change into the planar state or the three-dimensional state. Then, the structure of each element of the lampshade 1, the connection between the elements, and their operation are further illustrated in detail.

Figure 2A:
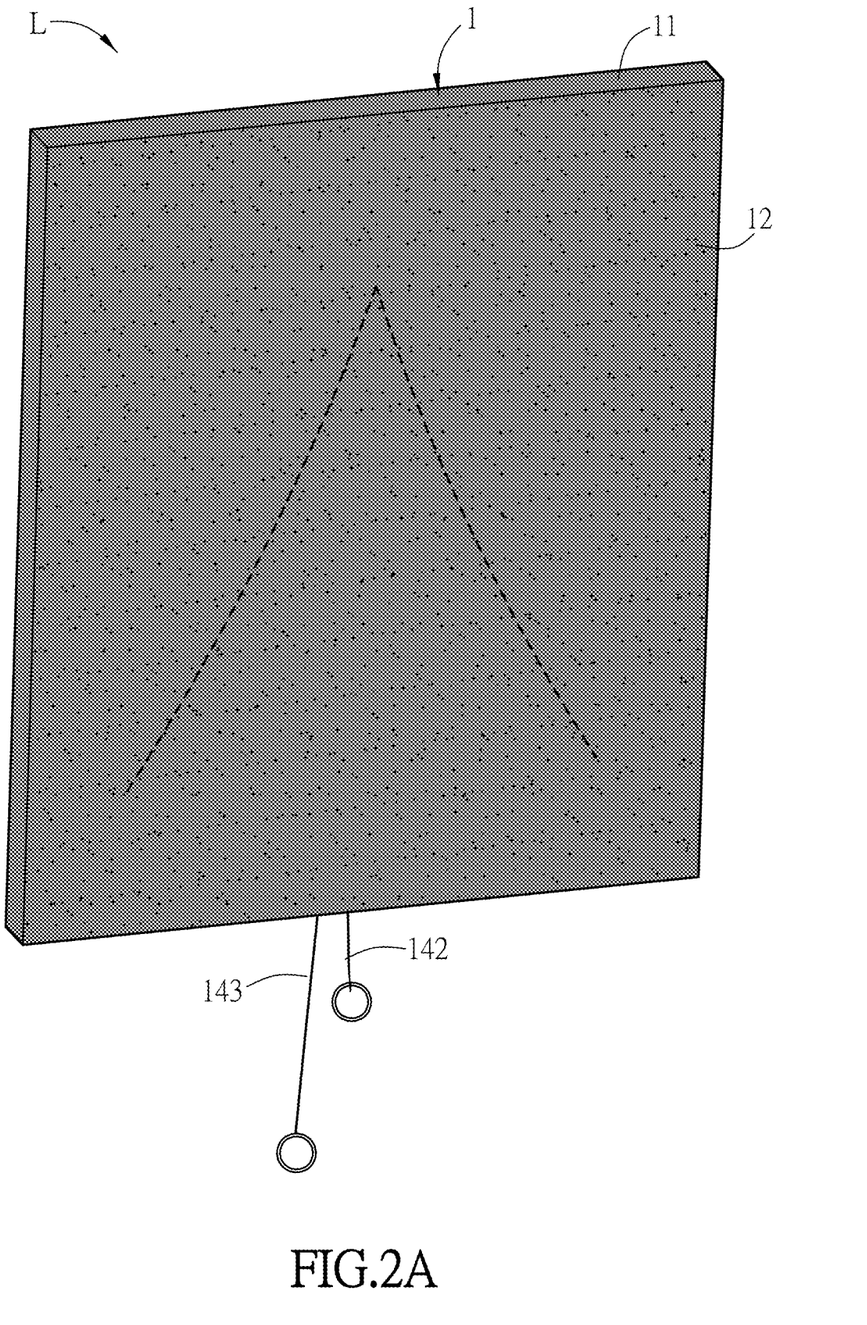
FIG. 2A is a schematic diagram of the lampshade shown in FIG. 1 in the planar state.
Figure 2B:
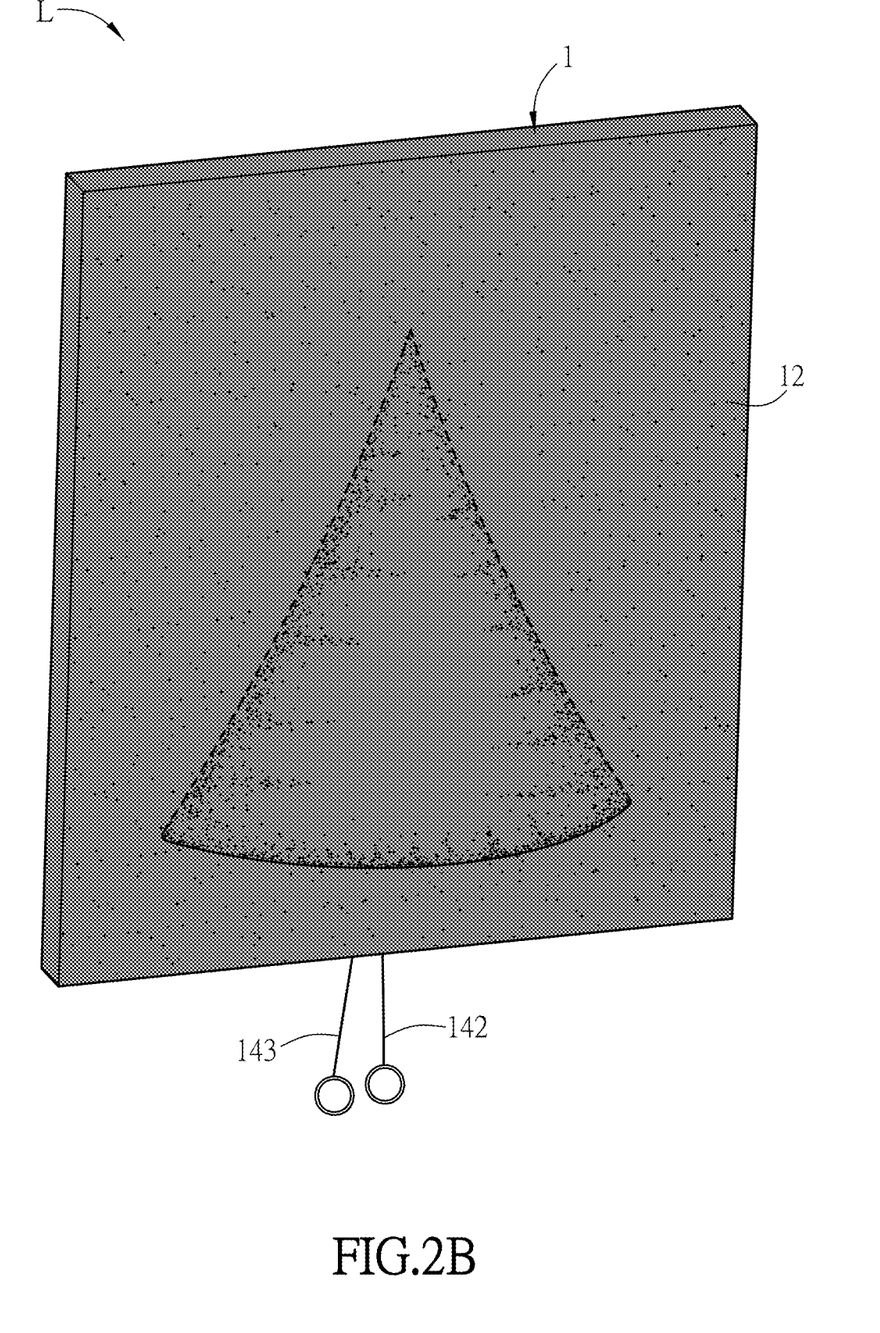
FIG. 2B is a schematic diagram of the lampshade shown in FIG. 1 in the three-dimensional state.
Figure 3A:
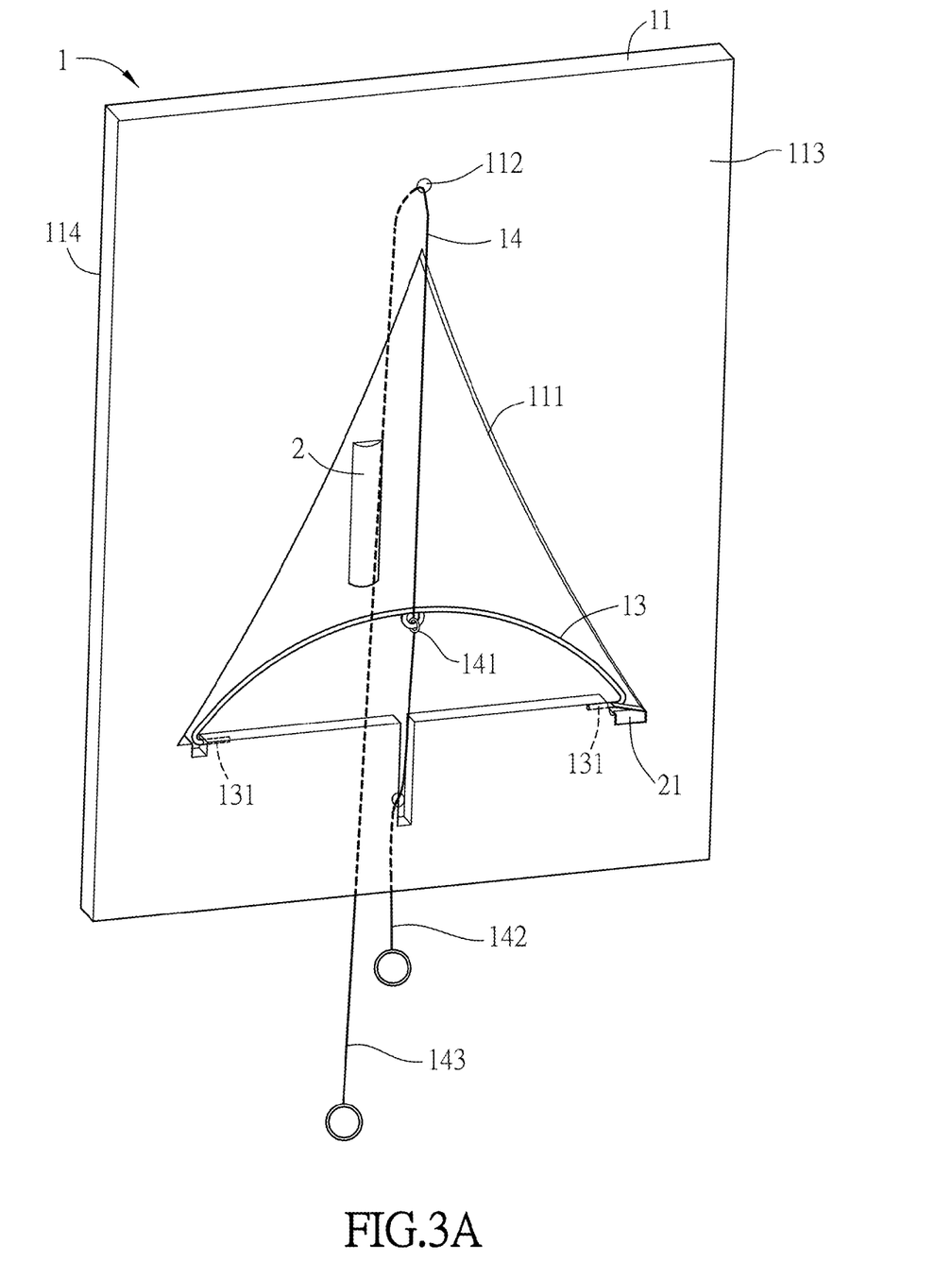
FIGS. 3A and 3B are schematic diagrams showing the operation of the support member shown in FIG. 1.
Figure 3B:
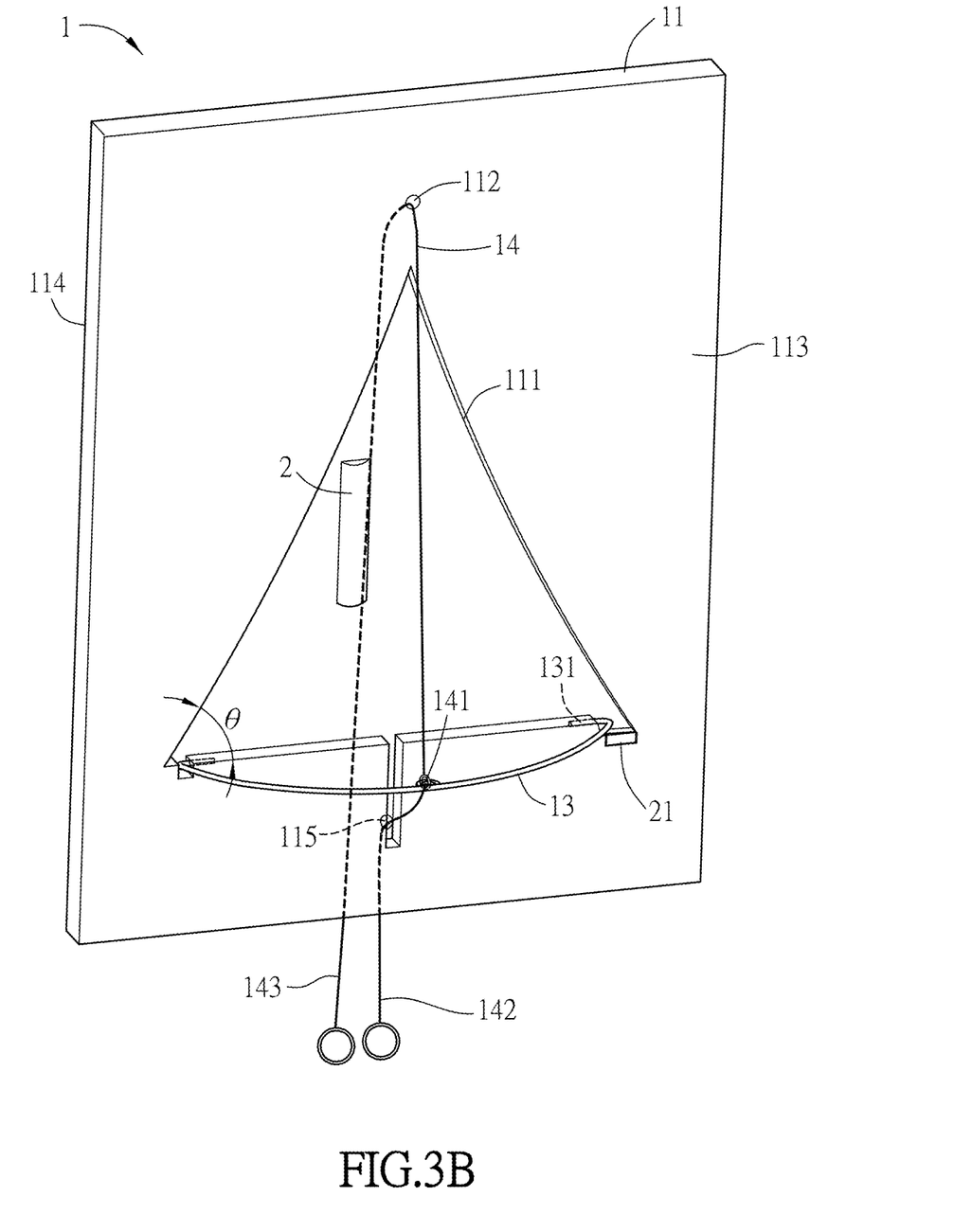

FIG. 2A is a schematic diagram of the lampshade shown in FIG. 1 in the planar state, FIG. 2B is a schematic diagram of the lampshade shown in FIG. 1 in the three-dimensional state, and FIGS. 3A and 3B are schematic diagrams showing the operation of the support member shown in FIG. 1. FIG. 3A corresponds to the planar state of FIG. 2A, and FIG. 3B corresponds to the three-dimensional state of FIG. 2B. Referring to FIG. 2A and FIG. 3A, the light-emitting unit 2 according to the embodiment is disposed on the base plate 11 and in the container 111, and the elastic cover 12 covers the surface 113 of the base plate 11. in this embodiment, the elastic cover 12 only covers the surface 113. However, in other embodiments, the elastic cover 12 may also be extended to cover the surface 114 on the other side. Preferably, the elastic cover 12 may be elastic and light transmissive Lycra fabric, so the light emitted from the light-emitting unit 2 can penetrate the elastic cover 12. It may also be other elastic and light transmissive materials. The elastic cover 12 may also have various patterns thereon, so it can show various appearances when the light of the light-emitting unit 2 penetrates the elastic cover 12. Moreover, the type of the light-emitting unit 2 is for example but not limited to incandescent lamp, fluorescent lamp, light-emitting diode (LED), or the like. Preferably, the light-emitting diode (LED) is used as the light-emitting unit 2 in this embodiment.

In this embodiment, the support member 13 is capable of being received in the container 111. It means the support member 13 may be received in the container 111 to present the planar state (as shown in FIG. 2A and FIG. 3A); or the support member 13 and the base plate have a predetermined included angle θ to present the three-dimensional state (as shown in FIG. 2B and FIG. 3B). That is, in FIG. 3B, the predetermined included angle θ is between the support member 13 and the base plate 11 in the three-dimensional state. The planar state called in the embodiment indicates the elastic cover 12 is planar when the support member 13 is received in the container 111. Correspondingly, referring to FIG. 2B and FIG. 3B, the three-dimensional state called in the embodiment indicates the support member 13 rotates around the pivots 131 and the support member 13 and the base plate 11 have a predetermined included angle. At this time, the elastic cover 12 is stretched by the support member 13 to present the three-dimensional state.

For example, the support member 13 according to the embodiment is a strip-shaped skeleton and looks like a curved shape. Two ends, of the support member 13 are bent to form two pivots 131. The pivots 131 are connected. to the base plate 11, so the support member 13 can rotate around the pivots 131 with respect to the base plate 11. In the embodiment, two ends of the support member 13 are bent inward. It means that two ends of the support member 13 are bent toward the inside of the curved shape (the support member 13) as shown in FIG. 1 or FIG. 3B. However, in other embodiments, two ends of the support member 13 may be bent outward to form the pivots 131, and they are not limited thereto. Moreover, the pivots 131 are pivotally connected to the base plate 11. Namely, the pivots 131 pivots on the base plate 11, and the pivots 131 are located on the bottom edge of the container 111. When the support member 13 is rotated toward the base plate 11, the support member 13 can be received in the container 111, so the lampshade 1 presents the planar state (as shown in FIG. 2A). When the support member 13 is rotated toward the direction away from the base plate 11, as shown in FIG. 3B, the support member 13 and the base plate 11 have a predetermined included angle θ, such that the lampshade 1 presents the three-dimensional state (as shown in FIG. 2B).

In the embodiment, the linking-up member 14 can allow the support member 13 to move. For example, a user applies a force to the linking-up member 14 to rotate the support member 13, namely rotate the support member 13 around the pivots 131. In the embodiment, the statement "the linking-up member 14 can allow the support member 13 to move" means the support member 13 is rotated by the linking-up member 14 where a force is applied. In the embodiment, the linking-up member 14 includes a fixing portion 141, a first end 142 and a second end 143. The first end 142 and the second end 143 are oppositely configured. The fixing portion 141 is configured between the first end 142 and the second end 143, and fixed to the support member 13. The linking-up member 14 is movably disposed at the positioning member 112 of the base plate 11. The linking-up member 14 may be a rope-shaped object, namely a rope which is not limited to any material and may be for example but not limited to a cotton rope, a nylon rope, a leather cord, an iron chain, or a combination thereof. Moreover, the positioning member 112 according to the embodiment can set the linking-up member 14 at a specific location of the base plate 11, and the linking-up member 14 still can move at the positioning member 112. In this embodiment, the positioning member 112 is a thorough hole through the base plate 11. In other embodiments, the positioning member may be a ring (referring to FIG. 5).

Figure 4A:
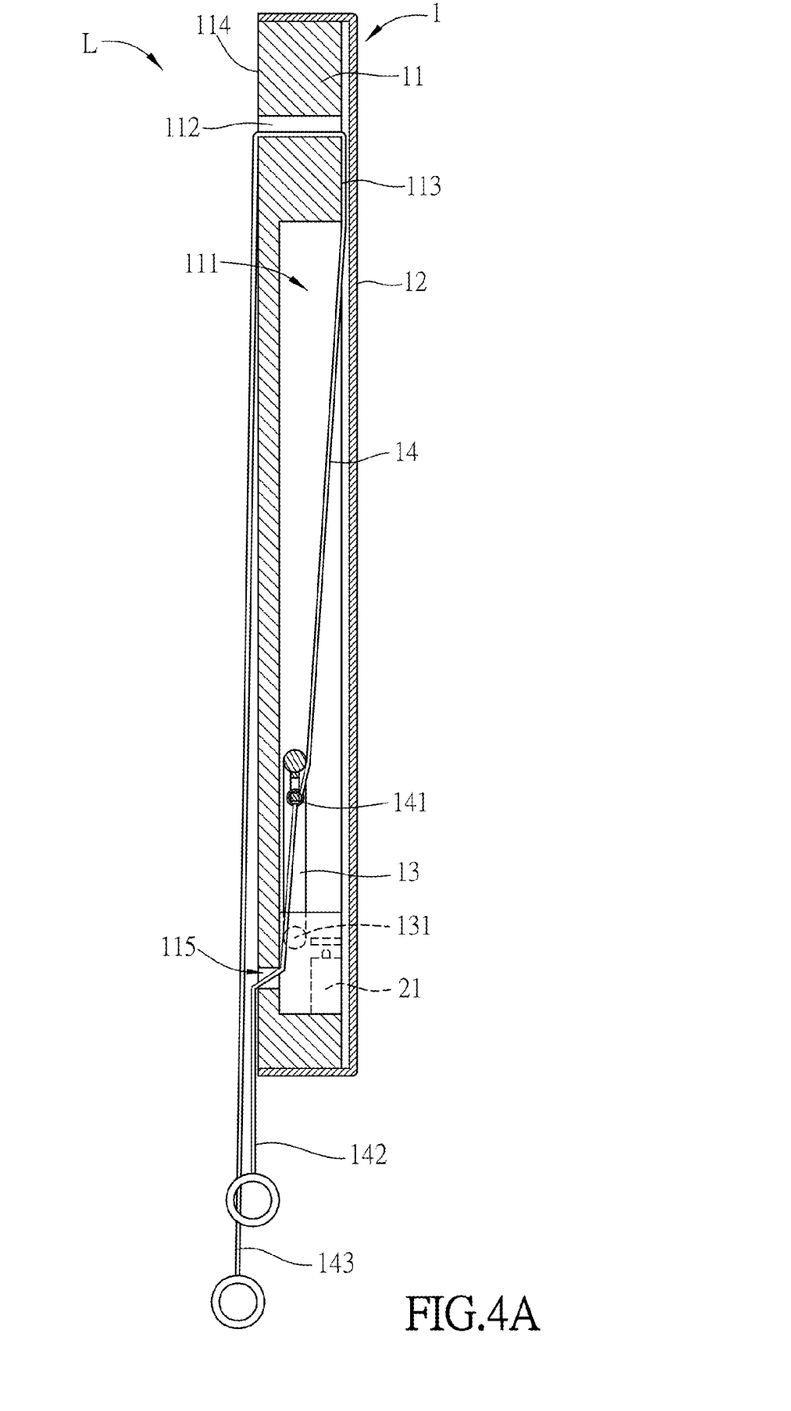
FIG. 4A is a lateral schematic diagram of the lampshade shown in FIG. 2A.
Figure 4B:
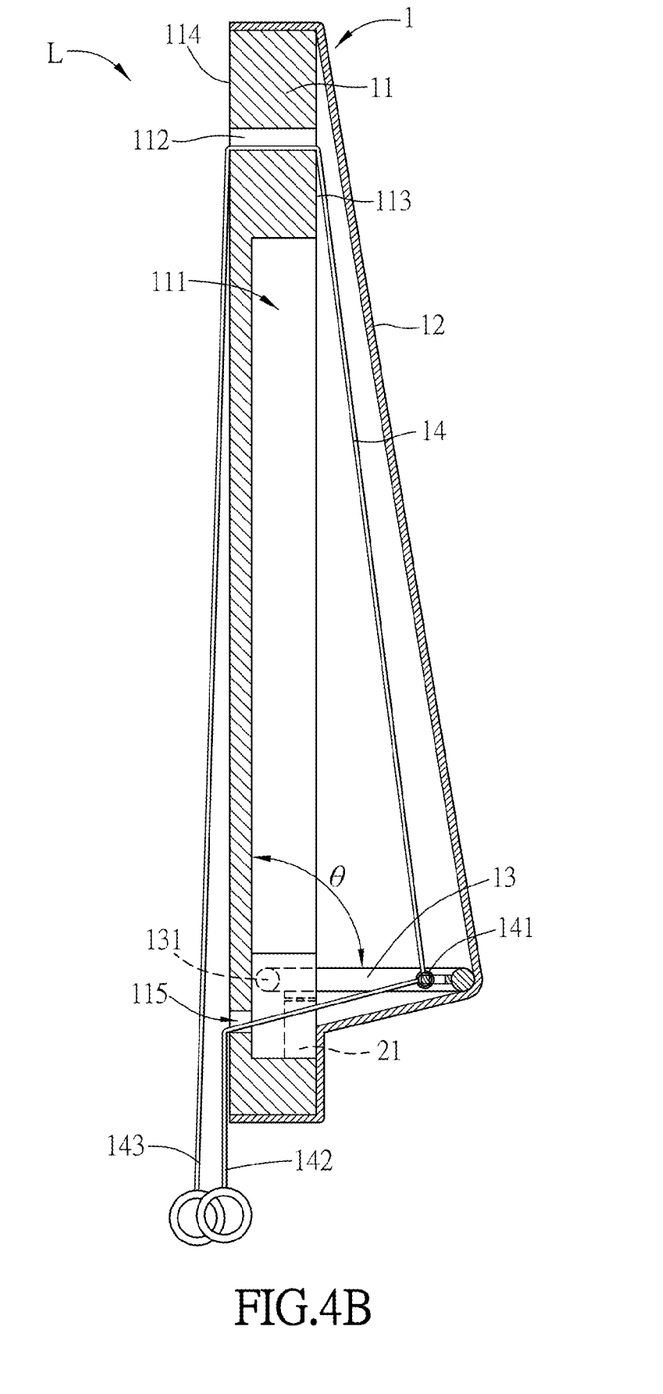
FIG. 4B is a lateral schematic diagram of the lampshade shown in FIG. 2B.

Referring to FIG. 4A and FIG. 4B, FIG. 4A is a lateral schematic diagram of the lampshade shown in FIG. 2A, and FIG. 4B is a lateral schematic diagram of the lampshade shown in FIG. 2B. In this embodiment, a rope-shaped object is illustrated as the linking-up member 14. The linking-up member 14 is movably disposed at the positioning member 112. In the embodiment, the positioning member 112 is the thorough hole, so the term "movably disposed" here indicates the linking-up member 14 passes through the thorough hole. After the linking-up member 14 passes through the positioning member 112, two ends of the linking-up member 14 respectively lies on the two surfaces 113, 114 of the base plate 11. The end near the fixing portion 141 is called first end 142, and the end passing through the positioning member 112 is called second end 143. Further, the fixing portion 141 of the linking-up member 14 is fixed to the support Member 13. In the embodiment, the linking-up member 14 is directly tied to the support member 13 as shown in FIG. 3, and the tied portion is called fixing portion 141. In other embodiment, the linking-up member 14 may also consist of two rope-shaped objects. For example, one end of one of the rope-shaped objects is fixed to the support member 13, and the other end hung down to form the above mentioned first end. One end of the other rope-shaped object is also fixed to the support member 13, and its other end passes through the positioning member 112 and then hangs down to form the above mentioned second end. In other words, one end of each rope-shaped object is fixed to the support member 13 and forms the fixing portion 141 together, and the unfixed ends are respectively the first end 142 and the second end 143.

Preferably, in addition to the positioning member 112, the base plate 11 according to the embodiment may include another thorough hole 115, so the first end 142 may pass through the thorough hole 115. Accordingly, the first end 142 and the second end 143 both lie on the surface 114 which does not have the container 111 and the support member 13. Because the elastic cover 12 is stretched by the support member 13, the whole lamp L according to the embodiment can transform between the planar state and the three-dimensional state. The first end 142 and the second end 143 are both configured on the surface 114 through the thorough hole 115, so the surface of the elastic cover 12 is not impacted by the first end 142 and becomes flatter.

Referring to FIG. 3A and FIG. 3B, the light-emitting unit 2 according to the embodiment includes a switch component 21 which is adjacent to one of the two pivots 131. Preferably, the switch component 21 may be disposed on the bottom edge of the container 111. Accordingly, when the support member 13 rotates around the pivots 131, the support member 13 may contact the switch component 21 or not. In detail, referring to FIG. 3B and FIG. 4B, when a force is applied to the first end 142 (e.g. pulled down), the support member 13 rotates around the pivots 131 and the support member 13 and the base plate 11 have the predetermined included angle θ. Preferably, the predetermined included angle θ in the embodiment is substantially 90 degrees, and the elastic cover 12 is stretched by the support member 13 such that the lamp L presents the three-dimensional state. When the predetermined included angle θ of the support member 13 and the base plate 11 is close to 90 degrees in rotating the support member 13 around the pivots 131, a part of the support member 13 may contact the switch component 21, and then the light-emitting unit 2 will be turned on. The size of the predetermined included angle θ depends on the relative positions between the switch component and the support member 13, but it is not limited thereto. Referring to FIG. 3A and FIG. 4A, correspondingly, when another force is applied to the second end 143, the support member 13 rotates around the pivots 131 and the support member 13 is pulled toward the container 111, so the support member 13 will be received in the container 111. At this time, the lampshade 1 presents the planar state, the support member 13 does not contact the switch component 21 to turn off the light-emitting unit 2.

Briefly, if a user wants to turn on the light, the user can apply a downward force to the first end 142 so the support member 13 rotates around the pivots 131 due to the downward pulling force, and the support member 13 and the base plate 11 have the predetermined included angle θ. At this time, the elastic cover 12 is stretched to present the three-dimensional state, and the part of the support member 13 also presses the switch component 21 to turn on the light-emitting unit 2 simultaneously. If a user wants to turn off the light, the user can apply a downward force to the second end 143 so the support member 13 is pulled up by the force from the second end 143 and then rotates around the pivots 131 to be received in the container 111. At this time, the elastic cover 12 presents the planar state, and the light-emitting unit 2 is turned off because the support member 13 does not contact the switch component 21. The arrangement of the support member 13 and the switch component 21 and the design of the base plate 11 and the elastic cover 12 allow the lamp L to be hung on the wall or placed upright on the desk. When not in use (turned off), the lamp L is in the planar state for space saving and easy installation. It is amusing in use that the light-emitting unit is turned on (the light is turned on) while the lamp L is in the three-dimensional state, and the light-emitting unit is turned off (the light is turned off) while the lamp is in the planar state.

Figure 5:
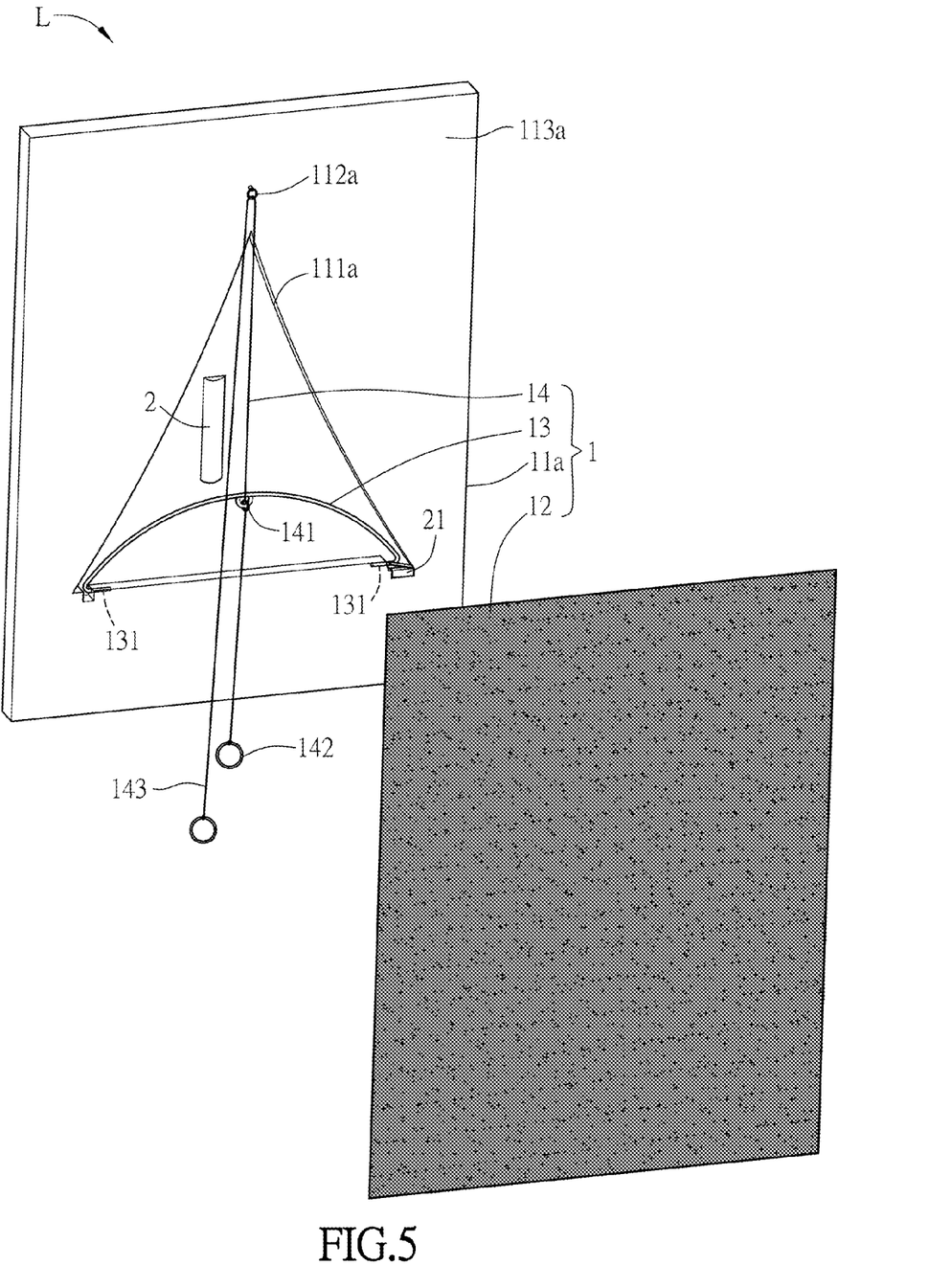
FIG. 5 is a schematic diagram of the base plate according to the second embodiment.

FIG. 5 is a schematic diagram of the base plate according to the second embodiment. In this embodiment, the positioning member 112a of the base plate 11a may also be a ring. The rope-shaped object used as the linking-up member 14 is movably disposed in the ring. That is to say, after the linking-up member 14 passes through the ring, the first end 142 and the second end 143 lie on the surface 113a of the base plate 11a which has the container 111a on that side. Similarly, a user may apply a downward force to the first end 142 to rotate the support member 13 around the pivots 131 and then stretch the elastic cover 12, so the pivots 131 contacts the switch component 21 to turn on the light. A user may also apply a downward force to the second end 143 to rotate the support member 13 around the pivots 131 to pull the support member 13 back into the container 111a, so meanwhile the pivots 131 does not contact the switch component 21 and this turns off the light. The detailed operations of other elements may refer the first embodiment, so they are not repeated here.

Figure 6:
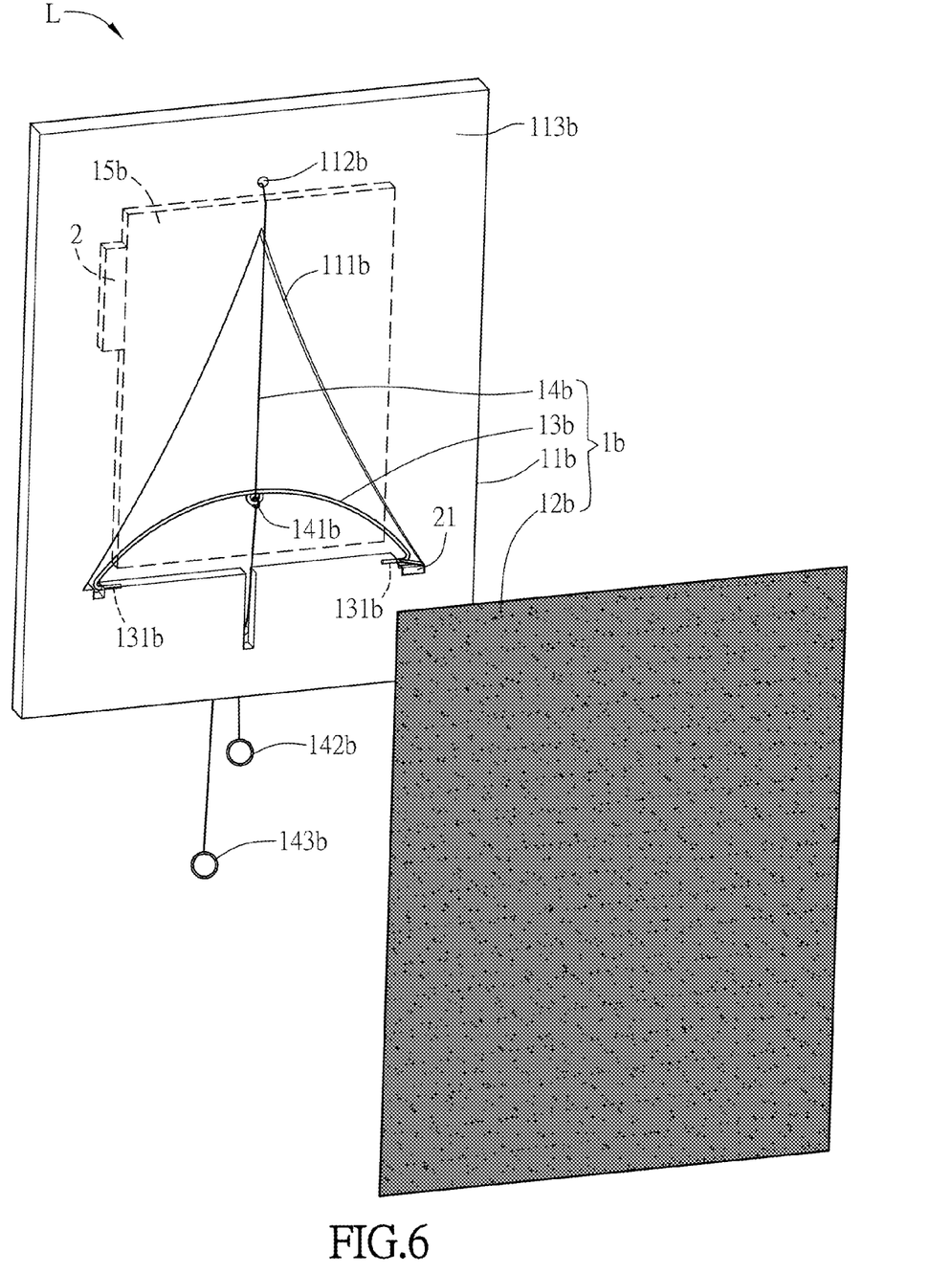
FIG. 6 is a schematic diagram of the lampshade according to the third embodiment.

Referring to FIG. 6, it is a schematic diagram of the lampshade according to the third embodiment. In the embodiment, the lampshade lb may further include a light guide plate 15b disposed on the base plate 11b. Preferably, the light guide plate 15b is disposed in the container 111b, so a part of the light guide plate 15b is revealed from the container 111b. Moreover, the light guide plate 15b is connected to the light-emitting unit 2, and then the light can be emitted by the light guide plate 15b when the light-emitting unit 2 is turned on. Similarly, because the detailed operations of other elements ay refer to the first embodiment, they are not repeated here.

Figure 7A:
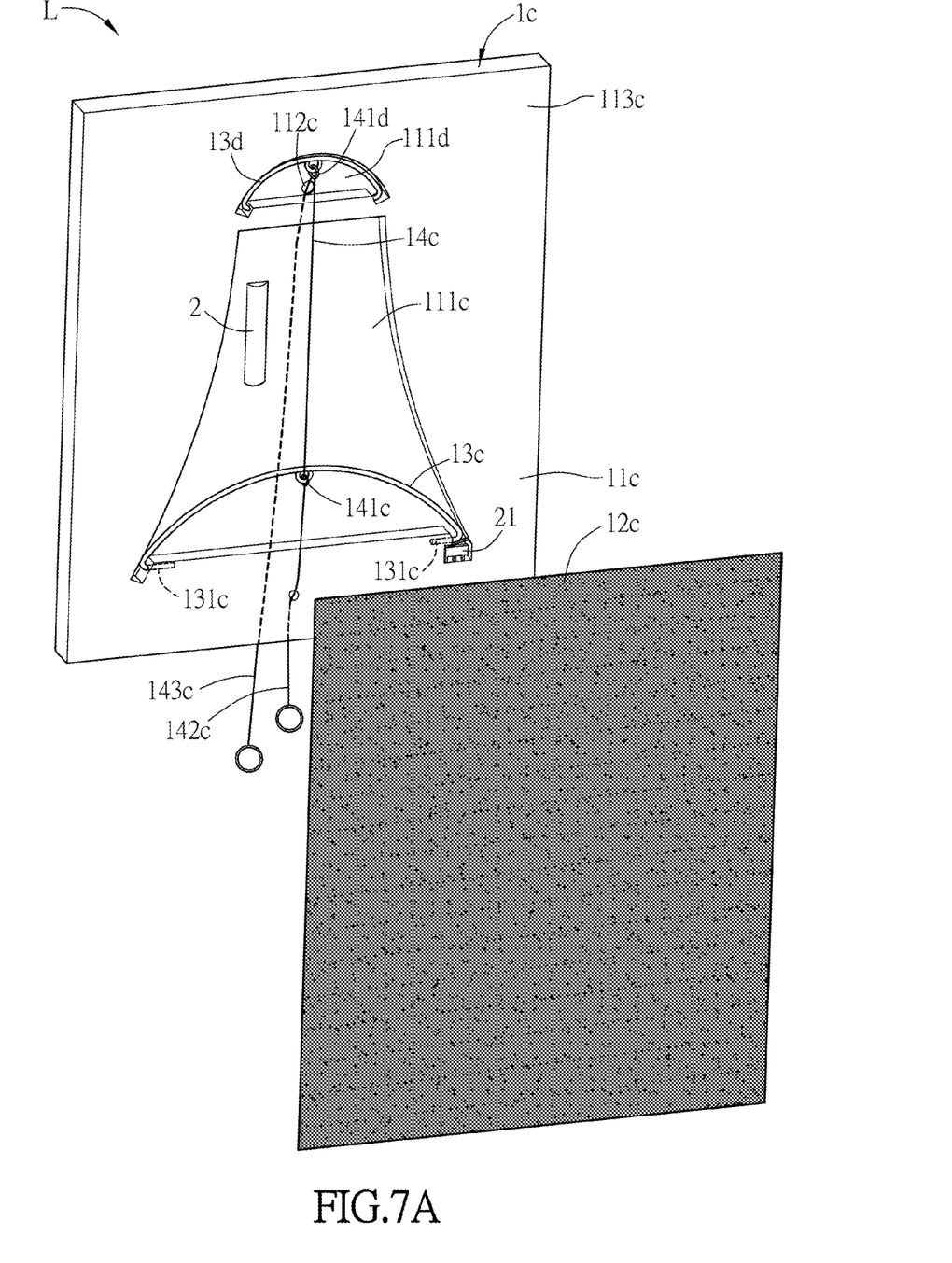
FIG. 7A is a schematic diagram of the lampshade according to the fourth embodiment.
Figure 7B:
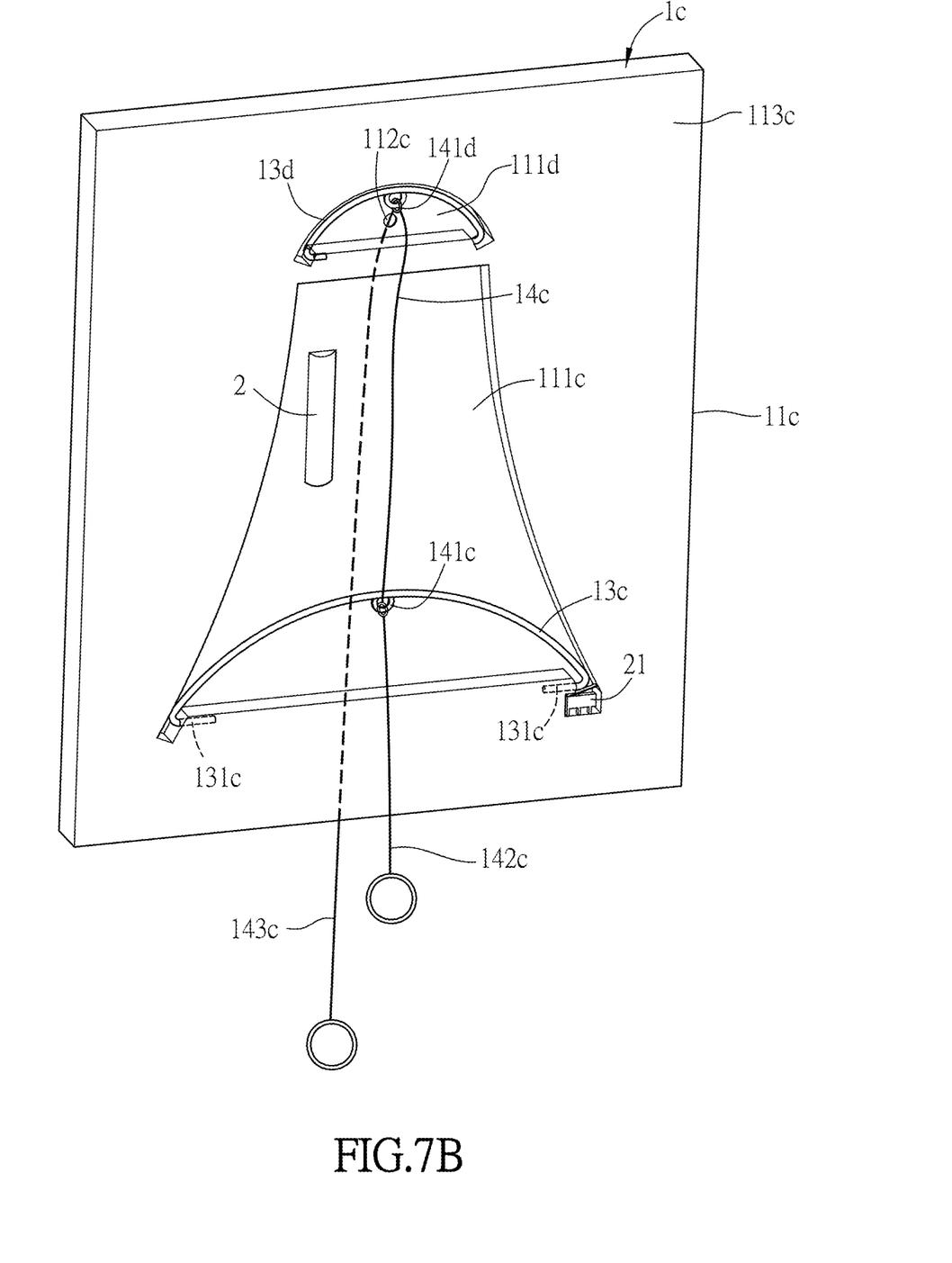
FIGS. 7B and 7C are schematic diagrams showing the operations of the support members shown in FIG. 7A.
Figure 7C:
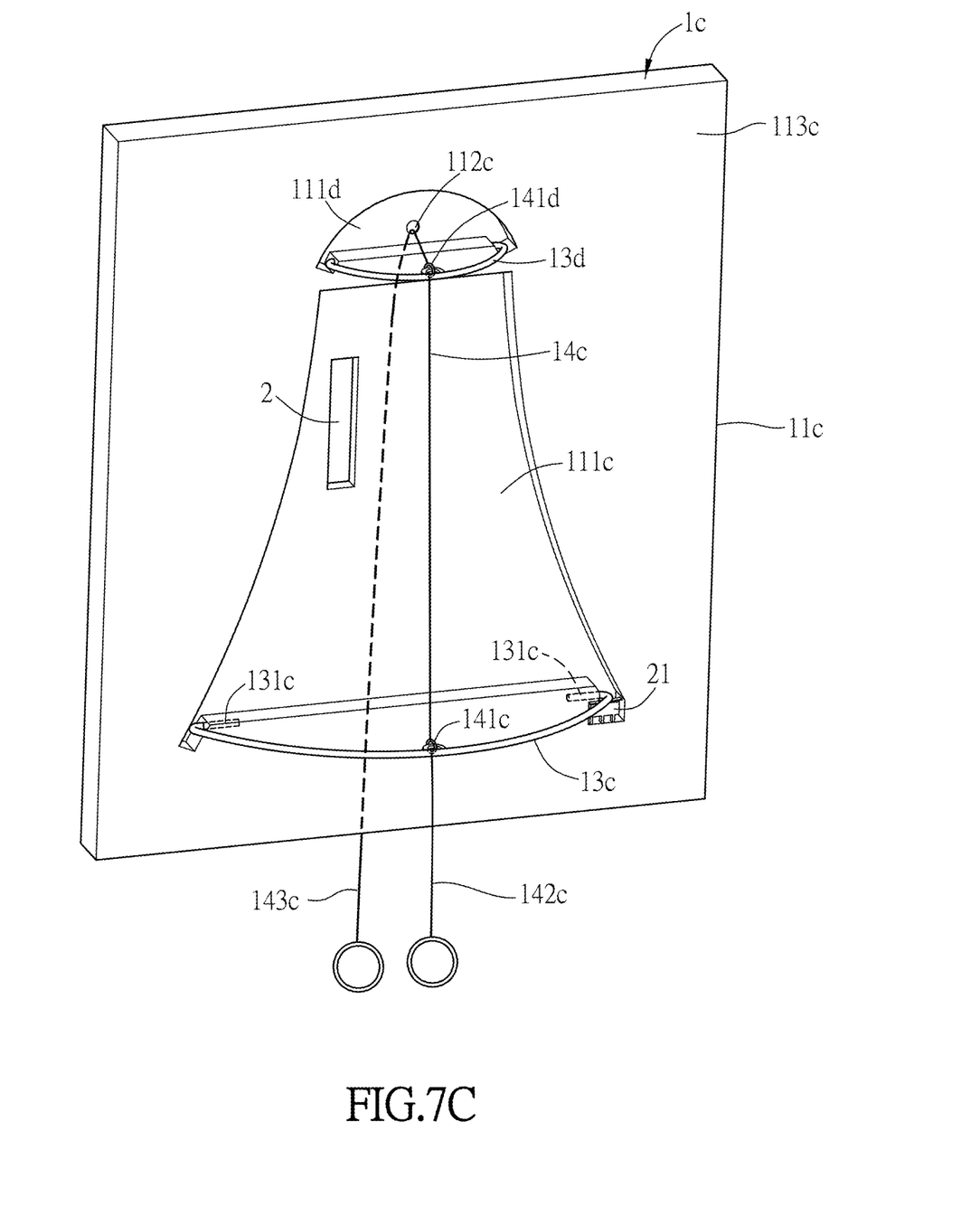

Moreover, the number of the support members 13 is not limited. FIG. 7A is a schematic diagram of the lampshade according to the fourth embodiment. As shown in FIG. 7A, the lampshade 1c according to this embodiment has two support members 13c, 13d. Preferably, the number of the containers 111c, 111d matches that of the support members 13c, 13d. In the embodiment, the lampshade 1c includes the base plate 11c, the elastic cover 12c, two support members 13c, 13d, and one linking-up member 14c. The base plate 11c has two containers 111c, 111d and the positioning member 112c. The support member 13c is received in the container 111c, and the support member 13d is received in the container 111d. Referring to FIGS. 7B and 7C, they are schematic diagrams showing the operations of the support members shown in FIG. 7A. in the embodiment, the positioning member 112c is disposed in the container 111d, and the linking-up member 14c is also a rope-shaped object. The linking-up member 14c has two fixing portions 141c, 141d, the fixing portion 141c is fixed to the support member 13c, and the fixing portion 141d is fixed to the support member 13d. The linking-up member 14c passes through the positioning member 112c and has a first end 142c and a second end 143c configured opposite each other. Similarly, a user may apply a downward force to the first end 142c, meanwhile, to make the support member 13c and the support member 13d rotate respectively around the pivots 131c and the pivots 131d as axes, so the support member 13c and the support member 13d stretch the elastic cover 12c simultaneously to form a three-dimensional state different from the first embodiment. At this time, the pivots 131c contact the switch component 21 so as to turn on the light. In other embodiments, the switch component 21 may also be disposed on the bottom edge of the container 111d, so that the support member 13d may contact the switch component 21, and it is not limited thereto. Moreover, a user may apply a downward force to the second end 143c while turning the light off to make the support member 13c rotate around the pivots 131c to pull the support member 13c and the support member 13d respectively back into the container 111c and the container 111d, and meanwhile to let the pivots 131c not contact the switch component 21 so as to turn off the light. The detailed operations of all other elements may refer to the first embodiment, so they are not repeated here. As mentioned above, because the different numbers, shapes and arrangements of the support members, for example the support member may be semi-circular, tapered or polygonal, the lampshade or the lamp may show various configurations and appearances when the support member stretches the elastic cover.

In summary, the lampshade according to the disclosure is designed with the movable support member, the connection between the linking-up member and the support member, and the elastic cover covering the surface of the base plate. As a result, when a user wants to switch the light on, the user may directly apply a downward force to the first end, so the support member rotates around the pivots due to the downward pulling force and the elastic cover becomes stretched in a three-dimensional state. Moreover, in the lamp according to the disclosure, the support member can contact the switch component to turn on the light-emitting unit. Conversely, a user y apply a downward force to the second end, so the support member is pulled up and then received in the container. At this time, the support member does not contact the switch component to turn off the light-emitting unit. The installation becomes easy because the base plate helps the lampshade and the lamp to be hung on the wall or placed upright on the desk. Moreover, when the lamp is not in use (turned off), the lampshade is in a planar state to save space. It is more amusing in use that the light-emitting unit is turned on if the lamp is in the three-dimensional state, and the light-emitting unit is turned off if the lamp is in the planar state.

Although the invention has been described with reference to specific embodiments, this description is not meant to be construed in a limiting sense. Various modifications of the disclosed embodiments, as well as alternative embodiments; will be apparent to persons skilled in the art it is, therefore, contemplated that the appended claims will cover all modifications that fall within the true scope of the invention.

What is claimed is:

1. A lampshade, comprising:
a base plate comprising at least a container and a positioning member, the container and the positioning member configured on a surface of the base plate;
an elastic cover covering the surface of the base plate;
at least a support member, two ends of the support member bent to form two pivots, the two pivots pivotally connected to the base plate, and the support member being capable of receiving in the container; and
a linking-up member comprising a fixing portion, a first end and a second end, the fixing portion configured between the first end and the second end, the fixing portion fixed to the support member, the linking-up member movably disposed at the positioning member, and the linking-up member allowing the support member to move.

2. The lampshade of claim 1, wherein the support member rotates around the pivots and a predetermined included angle is formed between the support member and the base plate when a force is applied to the first end; and the support member rotates around the pivots and the support member is received in the container when another force is applied to the second end.

3. The lampshade of claim 1, wherein the positioning member is a thorough hole, and the linking-up member passes through the thorough hole.

4. The lampshade of claim 1, wherein the positioning member is a ring, the linking-up member passes through the ring, and the first end and the second end are located on the surface of the base plate.

5. The lampshade of claim 1, wherein the linking-up member is a rope-shaped object.

6. A lamp, comprising:
a light-emitting unit having a switch component; and
a lampshade, comprising:
a base plate comprising at least a container and a positioning member, the container and the positioning member configured on a surface of the base plate, and the light-emitting unit disposed on the base plate;
an elastic cover covering the surface of the base plate;
at least a support member, two ends of the support member bent to form two pivots, the two pivots pivotally connected to the base plate, the support member being capable of receiving in the container, and the switch component being adjacent to one of the two pivots; and a linking-up member comprising a fixing portion, a first end and a second end, the fixing portion configured between the first end and the second end, the fixing portion fixed to the support member, the linking-up member movably disposed at the positioning member, and the linking-up member allowing the support member to move.

7. The lamp of claim 6, wherein the support member rotates around the pivots, a predetermined included angle is formed between the support member and the base plate and the support member contacts the switch component when a force is applied to the first end; and the support member rotates around the pivots, the support member is received in the container and the support member does not contact the switch component when another force is applied to the second end.

8. The lamp of claim 6, wherein the light-emitting unit is disposed in the container.

9. The lamp of claim 6, wherein the lampshade further comprises a light guide plate, and the light guide plate is disposed on the base plate and connected to the light-emitting unit.

10. The lamp of claim 9, wherein the light guide plate is disposed in the container.

11. The lamp of claim 6, wherein the positioning member is a thorough hole, and the linking-up member passes through the thorough hole.

12. The lamp of claim 6, wherein the positioning member is a ring, the linking-up member passes through the ring, and the first end and the second end are located on the surface of the base plate.

13. The lamp of claim 6, wherein the linking-up member is a rope-shaped object.

* * * * *